US012705695B2

(12) United States Patent
Bradley et al.

(10) Patent No.: US 12,705,695 B2
(45) Date of Patent: Aug. 11, 2026

(54) METHOD TO SELECT RESOLUTION VALUES

(71) Applicant: Siemens Industry Software Limited, Farnborough (GB)

(72) Inventors: Hugh Bradley, Cambridge (GB); Stefan Davids, Cambridge (GB)

(73) Assignee: SIEMENS INDUSTRY SOFTWARE LIMITED, Farnborough (GB)

( * ) Notice: Subject to any disclaimer, the term of this patent is extended or adjusted under 35 U.S.C. 154(b) by 477 days.

(21) Appl. No.: 17/957,573

(22) Filed: Sep. 30, 2022

(65) Prior Publication Data

US 2024/0112302 A1 Apr. 4, 2024

(51) Int. Cl.
*G06T 3/4092* (2024.01)
*G05B 19/4097* (2006.01)

(52) U.S. Cl.
CPC ........ *G06T 3/4092* (2013.01); *G05B 19/4097* (2013.01); *G05B 2219/35012* (2013.01)

(58) Field of Classification Search
None
See application file for complete search history.

(56) References Cited

U.S. PATENT DOCUMENTS

2020/0274823 A1* 8/2020 Yang .................... H04L 47/805
2023/0391013 A1* 12/2023 Gonzalez Martin ... B33Y 50/00
2024/0196237 A1* 6/2024 Rathor ................. H04W 24/08

* cited by examiner

*Primary Examiner* — Aaron M Richer
(74) *Attorney, Agent, or Firm* — Lempia Summerfield Katz LLC

(57) ABSTRACT

An apparatus includes a processor configured to determine a set of geometric relationships in relation to a set of object representations within a computer aided design model, where each geometric relationship is represented by a number, and is configured to determine a set of intervals within the set of geometric relationships that meet a resolution interval criterion, where each interval is a numerical range that does not include numbers representing the geometric relationships, and is configured to select a set of resolution values. Each resolution value is within one of the intervals according to a resolution setting criterion. The processor is configured to update the CAD model by implementing the set of resolution values, generate instructions for controlling a manufacturing process using the updated CAD model, and output the instructions to a manufacturing system for control of the manufacturing process according to the instructions.

18 Claims, 5 Drawing Sheets

METHOD TO SELECT RESOLUTION VALUES

FIELD

The present application relates to an apparatus for performing a method to select resolution values.

BACKGROUND

Computer Aided Design (CAD) models are used in order to generate computer models of parts and systems that may be constructed physically. For example, CAD software may be used to design an object such that the physical features of the object (e.g., size, shape, various structures comprised in the part, and the like) are defined. The resulting CAD model may be used in a manufacturing process to produce the object. For example, a person implementing the manufacturing process to produce the object may obtain details about the object from the CAD model in order to manufacture the object.

In some examples, the CAD models may be used by a manufacturing system that performs one or more parts of the manufacturing process. The manufacturing system may obtain information from the CAD model in order to perform parts of the manufacturing process. For example, the manufacturing system may use geometric constraints specified in the CAD model (e.g., distance between certain features, lines which are to be parallel, lines that are to be perpendicular, etc.) relating to the object to be produced.

However, in some examples, the CAD model may behave in an undesired or inconsistent manner in terms of geometric constraints. In some examples, a user may wish to specify a set of geometric constraints in relation to the model. Whether or not the specified geometric constraints may be applied within the model may depend on the resolution values within the model. For example, if the resolution values are not appropriate, the geometric constraints may not be applied within the model. In some examples, the model may include objects originating from different sources. Such objects may have varying dimensions and may have been defined using different resolution values. For example, objects that are to form parts of an assembly may be designed separately (e.g., using different resolution values) and later be brought together in the CAD model in question. Pre-set resolution values within the model may not be appropriate for all such objects, and it may not be apparent to a user which resolution values are appropriate.

In such examples, the user may position and orient objects manually to achieve the desired positioning and orientation without there being a well-defined geometric constraint. In some examples, the user may make undesired changes to the model such that the geometric constraints may be applied. Other examples of work arounds are possible. However, generally speaking, not being able to specify a set of geometric constraints may lead to a sub-optimal model and therefore a sub-optimal manufacturing process and/or a sub-optimal end result in terms of objects manufactured.

As an example, three lines that are very close in angle to one another may or may not all be considered parallel for all instances. For example, whether or not all three lines are treated as parallel within the model may depend on the load order of the various parts in the model. In such examples, it may not be possible to successfully implement certain constraints relating to parallel lines within the model.

SUMMARY

It is advantageous to provide methods for operating CAD models that produce consistent geometric constraints.

According to a first aspect of the present embodiments, an apparatus for performing a method to select resolution values for a computer aided design model is provided. The apparatus includes a processor configured to: (i) determine a set of geometric relationships in relation to a set of object representations within the computer aided design model, where each geometric relationship is represented by a number; (ii) determine a set of intervals within the set of geometric relationships that meet a resolution interval criterion, where each interval is a numerical range that does not include numbers representing the set of geometric relationships; (iii) select a set of resolution values, where each resolution value is within one of the intervals according to a resolution setting criterion; (iv) update the computer aided design model by implementing the set of resolution values; (v) generate a set of instructions for controlling a manufacturing process using the updated computer aided design model; and (vi) output the set of instructions to a manufacturing system for the manufacturing system to control the manufacturing process according to the set of instructions.

In one embodiment, an interval meets the resolution interval criterion if the interval may accommodate a sub-interval. A lower limit of the sub-interval is greater than a lower limit of the interval by a sub-interval factor, and an upper limit of the sub-interval is smaller than an upper limit of the interval by the sub-interval factor.

In one embodiment, the sub-interval factor is between 2 and 100.

In one embodiment, the sub-interval factor is 10.

In one embodiment, the resolution value meets the resolution setting criterion if the resolution value is within the sub-interval corresponding to the interval within which the resolution value is set.

In one embodiment, determining the set of geometric relationships includes determining angular relationships and distance relationships. Determining the set of intervals includes determining a sub-set of intervals for the angular relationships, and a sub-set of intervals for the distance relationships. Selecting a set of resolution values includes selecting an angular resolution value within an interval of the sub-set of intervals for the angular relationships according to the resolution setting criterion, and selecting a linear resolution value within an interval of the sub-set of intervals for the distance relationships according to the resolution setting criterion.

In one embodiment, as part of selecting the set of resolution values, the processor is configured to determine whether or not a model size criterion is met. The model size criterion is met if a ratio of the selected linear resolution value to the selected angular resolution value is greater than a model size value. If the model size criterion is not met, the processor is configured to adjust one or both of the selected linear resolution value and the selected angular resolution value such that the model size criterion is met.

In one embodiment, if adjustment of one or both of the selected linear resolution value and the selected angular resolution value has occurred, the processor is configured to, for each adjusted resolution value, select an interval from the respective sub-set of intervals that is closest to the respective adjusted resolution value. The processor is further configured to select an updated value for the respective resolution within the selected interval according to the resolution setting criterion.

In one embodiment, the computer aided design model includes a set of initial resolution values. The processor is configured to iterate (i) to (iv) if one or both of the resolution values in the selected set of resolution values are different than the corresponding values from the set of initial resolution values. The iterating is continued until a set number of iterations are reached or there is an iteration that does not result in a change in the selected set of resolution values.

In one embodiment, the computer aided design model includes a set of initial resolution values. Selecting the set of resolution values includes selecting the initial resolution value as part of the selected set of resolution values if an initial resolution value from the set of initial resolution values is within one of the intervals according to the resolution setting criterion.

In one embodiment, the processor is configured to apply one or more geometric constraints in the updated computer aided design model prior to generating the set of instructions.

According to a second aspect of the present embodiments, a method to select resolution values for a computer aided design model is provided. The method includes: (i) determining a set of geometric relationships in relation to a set of object representations within the computer aided design model, where each geometric relationship is represented by a number; (ii) determining a set of intervals within the set of geometric relationships that meet a resolution interval criterion, where each interval is a numerical range that does not include numbers representing the set of geometric relationships; (iii) selecting a set of resolution values, where each resolution value is within one of the intervals according to a resolution setting criterion; (iv) updating the computer aided design model by implementing the set of resolution values; (v) generating a set of instructions for controlling a manufacturing process using the updated computer aided design model; and (vi) outputting the set of instructions to a manufacturing system for the manufacturing system to control the manufacturing process according to the set of instructions.

In one embodiment, in the method according to the second aspect, an interval meets the resolution interval criterion if the interval may accommodate a sub-interval. The lower limit of the sub-interval is greater than the lower limit of the interval by a sub-interval factor. The upper limit of the sub-interval is smaller than the upper limit of the interval by the sub-interval factor.

In one embodiment, in the method according to the second aspect, the sub-interval factor is between 2 and 100.

In one embodiment, in the method according to the second aspect, the sub-interval factor is 10.

In one embodiment, in the method according to the second aspect, the resolution value meets the resolution setting criterion if the resolution value is within the sub-interval corresponding to the interval within which the resolution value is set.

In one embodiment, in the method according to the second aspect, determining the set of geometric relationships includes determining angular relationships and distance relationships. Determining the set of intervals includes determining a sub-set of intervals for the angular relationships and a sub-set of intervals for the distance relationships. Selecting a set of resolution values includes selecting an angular resolution value within an interval of the sub-set of intervals for the angular relationships according to the resolution setting criterion, and selecting a linear resolution value within an interval of the sub-set of intervals for the distance relationships according to the resolution setting criterion.

In one embodiment, as part of selecting the set of resolution values, the method according to the second aspect includes determining whether or not a model size criterion is met. The model size criterion is met if a ratio of the selected linear resolution value to the selected angular resolution value is greater than a model size value. If the model size criterion is not met, the method includes adjusting one or both of the selected linear resolution value and the selected angular resolution value such that the model size criterion is met.

In one embodiment, if adjustment of one or both of the selected linear resolution value and the selected angular resolution value has occurred, the method according to the second aspect includes, for each adjusted resolution value, selecting an interval from the respective sub-set of intervals that is closest to the respective adjusted resolution value, and selecting an updated value for the respective resolution within the selected interval according to the resolution setting criterion.

In one embodiment, in the method according to the second aspect, the computer aided design model includes a set of initial resolution values, and the method includes iterating (i) to (iv) if one or both of the resolution values in the selected set of resolution values are different than the corresponding values from the set of initial resolution values. The iterating is continued until a set number of iterations are reached or there is an iteration that does not result in a change in the selected set of resolution values.

In one embodiment, in the method according to the second aspect, the computer aided design model includes a set of initial resolution values. If an initial resolution value from the set of initial resolution values is within one of the intervals according to the resolution setting criterion, selecting the set of resolution values includes selecting the initial resolution value as part of the set of resolution values.

In one embodiment, the method according to the second aspect includes applying one or more geometric constraints in the updated computer aided design model prior to generating the set of instructions.

According to a third aspect of the present embodiments, a non-transitory computer readable data recording medium having stored thereon instructions that, when implemented by a processor, cause the processor to perform a method to select resolution values for a computer aided design model is provided. The method includes: (i) determining a set of geometric relationships in relation to a set of object representations within the computer aided design model, where each geometric relationship is represented by a number; (ii) determining a set of intervals within the set of geometric relationships that meet a resolution interval criterion, where each interval is a numerical range that does not include numbers representing the set of geometric relationships; (iii) selecting a set of resolution values, where each resolution value is within one of the intervals according to a resolution setting criterion; (iv) updating the computer aided design model by implementing the set of resolution values; (v) generating a set of instructions for controlling a manufacturing process using the updated computer aided design model; and (vi) outputting the set of instructions to a manufacturing system for the manufacturing system to control the manufacturing process according to the set of instructions.

BRIEF DESCRIPTION OF THE DRAWINGS

Examples relating to the present invention will now be described with reference to the accompanying drawings, in which.

DETAILED DESCRIPTION

The present application relates to performing a method to select resolution values for a computer aided design (CAD) model. For example, the method is implemented by an apparatus including a processor. The processor is configured to perform processes in order to execute the method.

In examples, the processor is configured to (i) determine a set of geometric relationships in relation to a set of object representations within the computer aided design model, where each geometric relationship of the set of geometric relationships is represented by a number. The processor is also configured to (ii) determine a set of intervals within the set of geometric relationships that meet a resolution interval criterion, where each interval of the set of intervals is a numerical range that does not include numbers representing the set of geometric relationships. In examples, the processor is configured to (iii) select a set of resolution values, where each resolution value of the set of resolution values is within one of the intervals according to a resolution setting criterion. In examples, the processor is configured to (iv) update the computer aided design model by implementing the set of resolution values. In examples, the processor is also configured to (v) generate a set of instructions for controlling a manufacturing process using the updated computer aided design model. In examples, the processor is also configured to (vi) output the set of instructions to a manufacturing system for the manufacturing system to control the manufacturing process according to the set of instructions.

Figure 1:
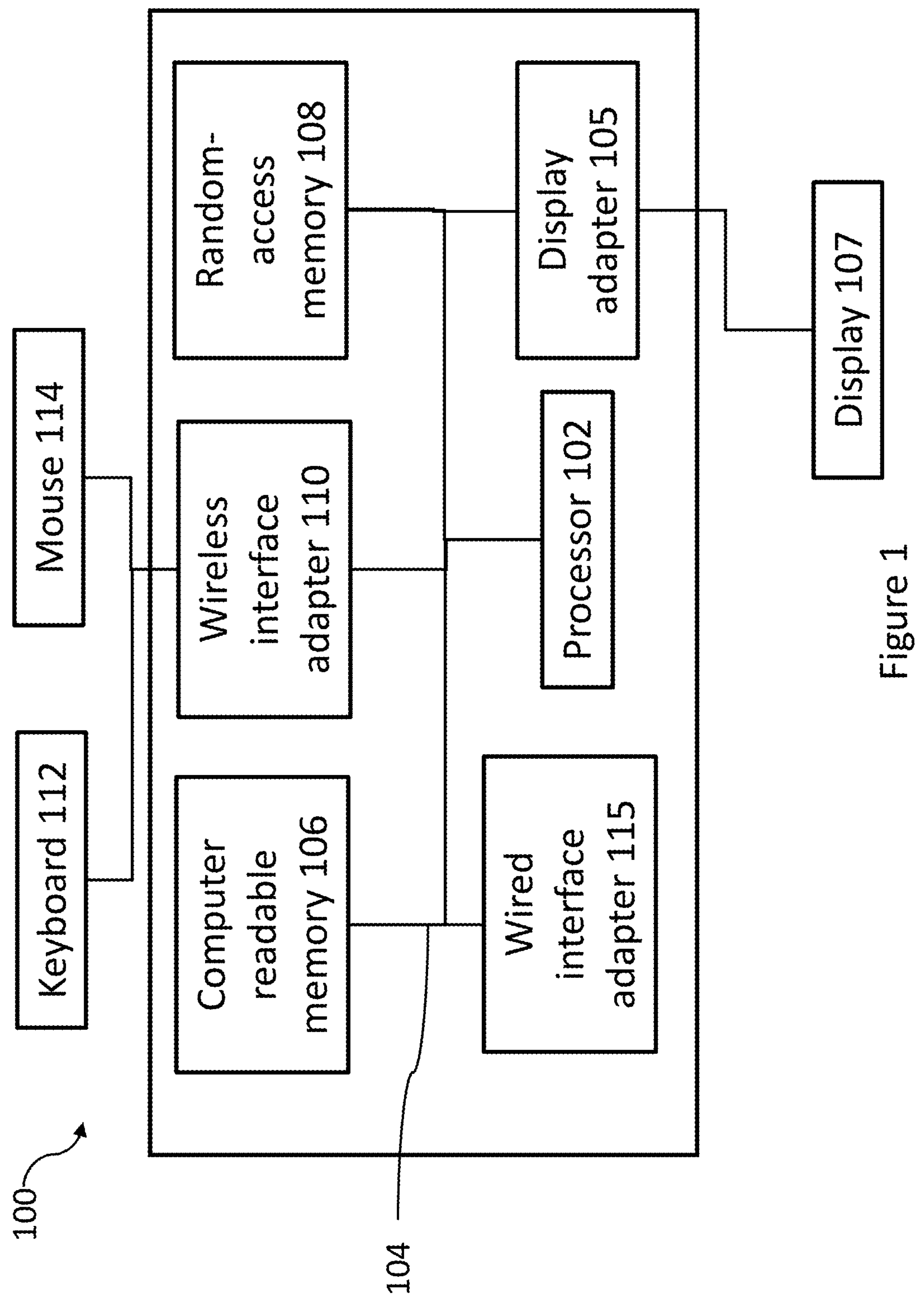
FIG. 1 is a schematic block diagram of a computing system, according to examples.

FIG. 1 is a simplified schematic sketch of an apparatus 100 including a processor 102 configured as described above. The apparatus 100 is, for example, a computing system. The apparatus 100 may, for example, be referred to as a data processing system. In some examples, the computing system 100 may include a local system bus 104 to which the processor 102 is connected. For example, the local system bus 104 may connect the processor 102 to other components such as a computer readable memory 106, a random-access memory 108, a display adapter 105, a wireless interface adapter 110, a wired interface adapter 115, and the like. For example, the display adapter 105 is connected to a display 107.

The computing system 100 may communicate with other systems via the wireless interface adapter 110 connected to the local system bus 104, or via a wired connection. For example, the wired interface adapter 115 may include a USB controller (e.g., including various types of USB ports), and the like. Examples of devices and systems with which the computing system 100 may communicate via a wired connection or wirelessly include a keyboard 112, a mouse 114, touch screen, trackball, camera, microphone, scanners, printers, speakers, pointer, touch pad, drawing tablet, joystick, keypad, motion sensing device that captures motion gestures, and the like. Some such devices function as input devices facilitating user input into the computing system 100, whereas some devices function as output devices. In the examples of FIG. 1, the computing system 100 communicates with the mouse 114 and keyboard 112 wirelessly.

As described above, the processor 102 is configured to determine a set of geometric relationships. The set of geometric relationships may include physical relationships in relation to position and orientation of objects or features of objects within the CAD model. In some examples, determining the set of geometric relationships includes determining angular relationships and distance relationships.

For example, the processor 102 may be provided with a CAD model that includes one or more object representations. A CAD software may be used as a graphical user interface to interact with a computer-generated model of objects. For example, a designer may design objects using the CAD software. In these examples, an object representation is a computer-generated representation of an object. For example, a CAD model may have one or more object representations. As an example, a user may construct a CAD model of a car in which the various parts of the car are the object representations within the CAD model. Reference herein to "the model" is in relation to a single model that contains all of the one or more object representations in question.

Those skilled in the art will appreciate that while a "CAD software" may be the graphical user interface used by a user to interact with a CAD model, other sets of processing instructions may also be implemented for performing various functions in relation to the CAD model. For example, the CAD model may interact with a dimensional constraint manager (DCM) that implements dimensional constraints within the CAD model.

The abovementioned distance relationships are distances between object representations or features of object representations. Taking the example of a CAD model for a car, the physical distance between a first car component and a second car component is one example of a distance relationship. The abovementioned angular relationships are similarly angles between objects or features of objects. The geometric relationships are represented by numbers. For example, a distance between a given part of one object and a given part of another object may be 5 millimeters. In some examples, all distance relationships and angular relationships may be measured and processed in the same respective units. The physical units being used (e.g., millimeters, meters, nanometers, etc.) may be selected arbitrarily, by a user, for example. The processing described herein is in relation to the numbers (e.g., 5) that represent the geometric relationships.

In the above description, processes (i) to (iv) are described. In some examples, as part of process (i), the processor 102 measures the set of geometric relationships. For example, the processor 102 is configured to measure any geometric relationships that may be relevant to applying geometric constraints.

For example, the numbers representing the geometric relationships may cluster together. For example, there may be a set of distance relationships close together in value, and another set of distance relationships close together in value. However, these two sets may be far away from each other in value. As an example, one set of distance relationships may be in the millimeters range, whereas another set of distance relationships may include distances which are several meters. The angular relationships may similarly cluster together.

In some examples, as part of process (ii), the processor 102 orders the geometric relationships. For example, the processor 102 arranges the geometric relationships in order of value. For example, an ordered list of distance relationship values is generated, and an ordered list of angular relationship values is generated.

For example, the processor 102 determines a set of intervals within the set of geometric relationships that meet a resolution interval criterion. The resolution interval criterion is described in further detail below. In some examples, determining the set of intervals includes determining a sub-set of intervals for the angular relationships. For example, the sub-set of intervals for angular relationships includes intervals within the ordered list of angular relationship values. In some examples, determining the set of intervals includes determining a sub-set of intervals for the distance relationships. For example, the sub-set of intervals for the distance relationships includes intervals within the ordered list of distance relationship values. The sub-set of intervals for the angular relationships may be referred to as the angular sub-set, and the sub-set of intervals for the distance relationships may be referred to as the distance sub-set, for brevity.

Those skilled in the art will appreciate that distance resolution values may be used to determine whether, for example, two points within the model are coincident. For example, if the distance between two points is less than the distance resolution value, those two points may be considered as coincident. Also, those skilled in the art will appreciate that angular resolution values may be used to determine whether, for example, two lines are parallel. For example, if the angle between two lines is less than the angular resolution value, those two lines may be considered to be parallel to one another. Accordingly, the resolution values are relevant to geometric relationships with the model. If the resolution values are close to the geometric relationship values, there may be difficulty in applying constraints to the geometric relationships. For example, if a set of points has distances therebetween within the model that are close to the distance resolution, then some points within that set may be considered coincident and some points may not be considered coincident. This may, for example, depend on the order in which the points are encountered. In such an example, it may be the case that the user's intention is for all points to be considered coincident. In this case, the distance resolution is not appropriately selected.

Those skilled in the art will appreciate similar examples in the case of angular relationships. For example, if a set of lines have small angles between them that are close in value to the angular resolution value, then some of those lines may be considered parallel to one another and some may not be considered parallel. This may depend, for example, on the order in which the lines are encountered. In such an example, it may be the case that the user's intention is for all lines to be considered parallel. In this case, the angular resolution is not appropriately selected. Accordingly, resolution values that are not close to values of the corresponding geometric relationships may be selected.

In examples, the resolution values apply to the whole model in question. For example, all objects within the model are treated according to the resolution values for the model.

For example, the intervals are examples of gaps within the ordered list where there are no numbers present. As an example, if the ordered list for the distance relationship values has a value of 0.005 meters (millimeter range) and the next value is 5 meters, then there is a gap between 0.005 and 5 that may be considered as an interval if the gap meets the resolution interval criterion. Reference is hereafter made to gaps. Not all gaps may be considered as intervals that meet the resolution interval criterion. Only those gaps that meet the resolution interval criterion may be considered as "intervals" for the purpose of the processing performed by the processor 102.

In some examples, the resolution interval criterion (hereafter referred to simply as the interval criterion) is met if the interval in question may accommodate a sub interval that meets the following conditions. For example, one of the conditions is that the lower limit of the sub-interval is greater than the lower limit of the interval by a sub-interval factor. For example, another condition is that the upper limit of the sub-interval is smaller than the upper limit of the interval by the sub-interval factor. Accordingly, in these examples, the sub-interval is sufficiently far away from the numbers that define the boundaries of the interval in question.

In some examples, the sub-interval factor is between 2 and 100. However, any values of the sub-interval factor greater than 1 may be deployed in view of the geometric relationships that exist within the model. In some examples, the sub-interval factor is 10. The sub-interval factor of 10 may be appropriate for a large number of example models. In such examples, the lower limit of the sub-interval is 10 times larger than the lower limit of the interval in question. In such examples, the upper limit of the interval is 10 times larger than the upper limit of the sub-interval. Taking the example of there being a gap between 0.005 meters and 5 meters, this gap may accommodate a sub-interval between 0.05 meters and 0.5 meters. Accordingly, in these examples, the gap between 0.005 and 5 is determined to be an interval included in the determined set of intervals. Although the specific numerical example is for distance relationships, the intervals and sub-intervals for angular relationships may work in the same way.

As described above, as part of process (iii), a set of resolution values is selected, where each resolution value of the set of resolution values is within one of the intervals according to a resolution setting criterion. In some examples, selecting a set of resolution values includes selecting an angular resolution value within an interval of the angular sub-set, according to the resolution setting criterion. In some examples, selecting a set of resolution values includes selecting a distance resolution value within an interval of the distance sub-set, according to the resolution setting criterion. For example, the resolution values apply over the whole model.

In some examples, the resolution setting criterion is met if the resolution value in question is within the relevant sub-interval. For example, for a given interval of the distance sub-set, a distance resolution value meets the resolution setting criterion if the distance resolution value is within the sub-interval of that given interval. Similarly, for example, for a given interval of the angular sub-set, an angular resolution value meets the resolution setting criterion if the angular resolution value is within the sub-interval of that given interval.

Accordingly, in these examples, resolution values that are relatively far away from any values of geometric relationships may be set. For example, the sub-interval factor is selected in accordance with how far away from any values of geometric relationships the resolution values are desired to be. The above description is in relation to both the angular resolution and the distance resolution. In some examples, the processor 102 may perform the processing of (i) to (iii) in relation to angular relationships, and subsequently in relation to distance relationships, or vice versa. In some examples, the processor 102 may perform a first part of the processing of (i) to (iii) in relation to angular relationships. Subsequently, the processor 102 may perform a first part of the processing of (i) to (iii) in relation to distance relationships. Subsequently, the processor 102 may perform a second part of the processing of (i) to (iii) in relation to angular relationships. Subsequently, the processor 102 may perform a second part of the processing of (i) to (iii) in relation to distance relationships, and so on, or vice versa. In some examples, the processor 102 may perform the processing of (i) to (iii) for the angular relationships and the distance relationships simultaneously.

In some examples, the CAD model includes a set of initial resolution values. For example, the CAD model may include an initial distance resolution value and an initial angular resolution value. In some examples, the distance interval that the distance resolution value is in is selected such that the corresponding sub-interval has values lower that the initial distance resolution. In this way, a smaller distance resolution value than the initial may be chosen. A smaller value means a higher resolution. If, however, no intervals exist that would provide a smaller resolution value, then a larger resolution value may be selected. This may apply similarly to the angular resolution value.

In some examples, values of the set of initial resolution values may already be within the relevant intervals where the interval criterion and the resolution setting criterion are met. In such examples, there may not be any need to select new resolution values as part of the set of resolution values selected during the processing of (iii). Accordingly, selecting the set of resolution values, as part of the processing of (iii), may include selecting the initial resolution value as part of the set of resolution values if that initial resolution value is within one of the relevant intervals according to the resolution setting criterion.

Figure 2:
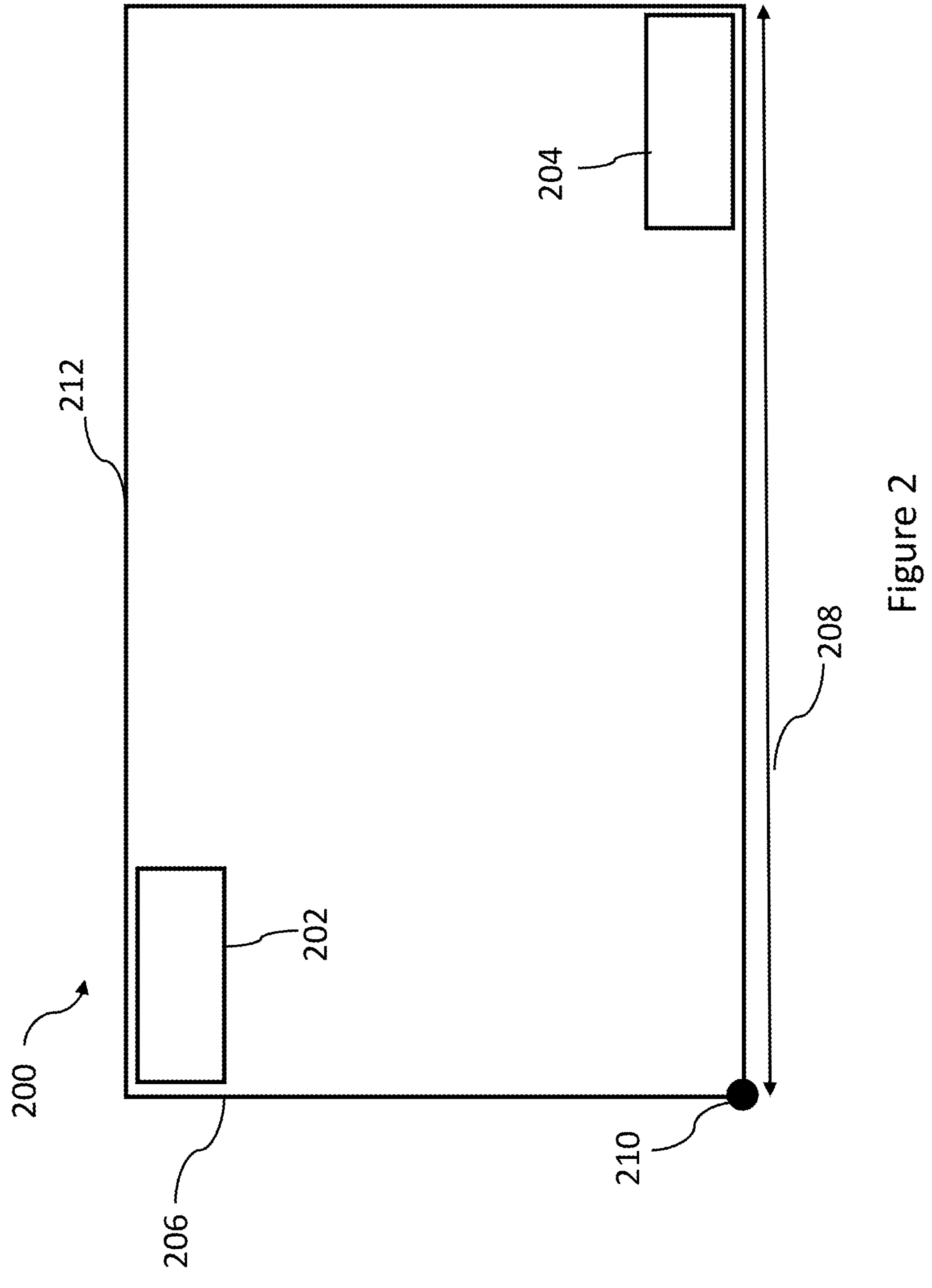
FIG. 2 is a first schematic block diagram of a computer aided design model, according to examples.

In some examples, after the processing of (iii), the processor 102 determines whether or not a model size criterion is met. Determining whether or not the model size criterion is met may involve use of the resolution values that have been set as part of the processing of (iii), and may therefore be performed once the set of resolution values have been selected. In some examples, the model size criterion is met if a ratio of the selected linear resolution value to the selected angular resolution value is greater than a model size. In some examples, the model size may be determined in the following manner. A bounding box that encloses all the object representations within the model may be drawn. In some examples, the model size may be taken to be the largest linear dimension of the bounding box. For example, in 3-dimensions, for a bounding box being considered in a linear coordinate system, the model size may be taken to be the largest of the three spatial dimensions of the bounding box. Other ways of characterizing the model size are possible (e.g., taking the largest linear distance in any direction that may be accommodated by the bounding box). FIG. 2 is a schematic sketch of a CAD model 200 in two dimensions. The CAD model 200 includes object representations 202 and 204 that are enclosed by the bounding box 206. In these examples, the origin 210 is set at one of the corners of the bounding box 206. In these examples, the largest box dimension 208 is taken to be the model size.

Figure 3:
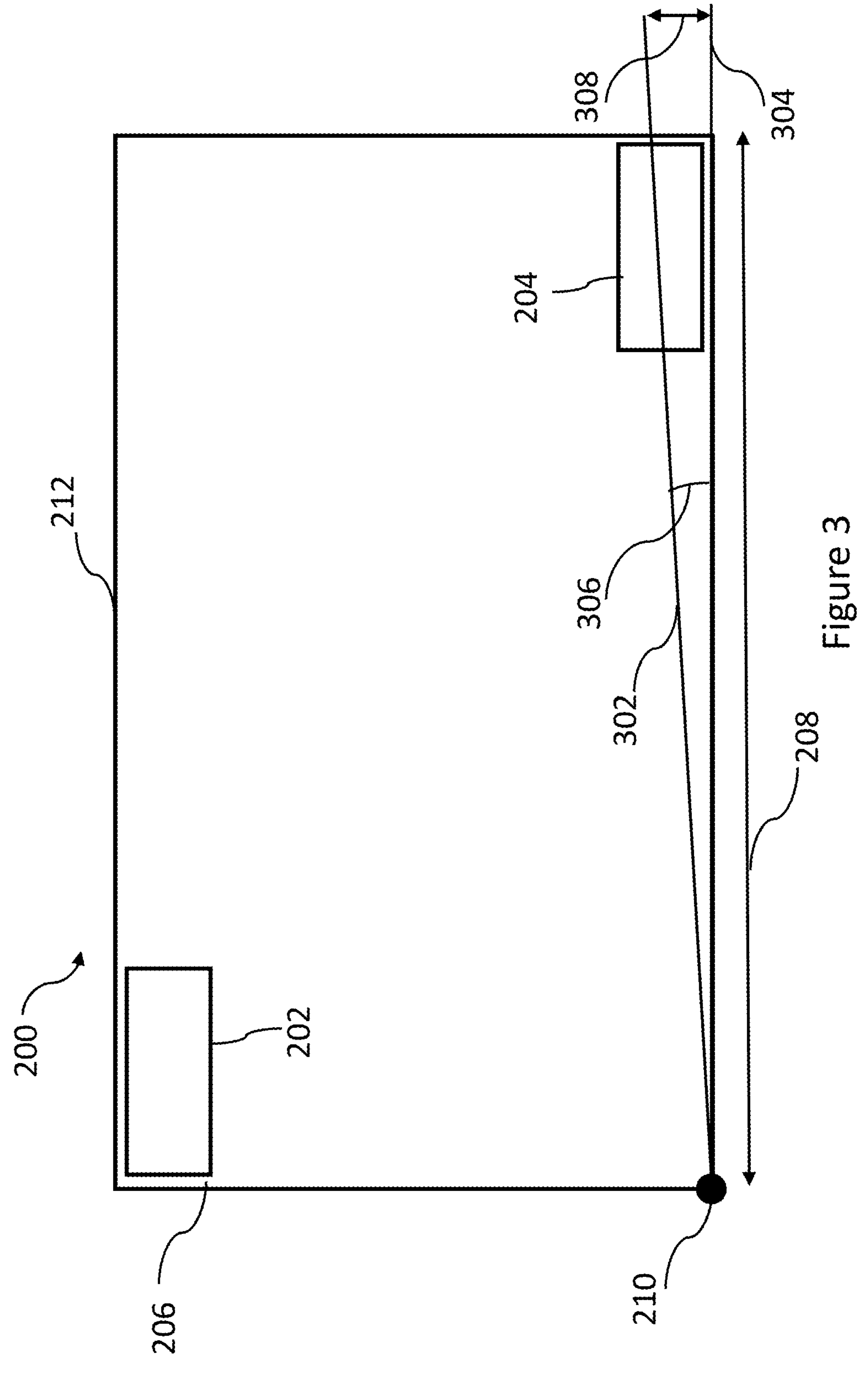
FIG. 3 is a second schematic block diagram of the computer aided design model, according to examples.

For the purpose of explanation, there may be considered to be two lines originating from the origin 210 that are very close in angle to one another. FIG. 3 is a second schematic sketch of the CAD model 200, according to examples. In FIG. 3, for the purpose of explanation, a first line 302 and a second line 304 are shown. These are the aforementioned lines very close together in angle (note that FIGS. 2 and 3 are for the purpose of explanation and do not necessarily depict realistic dimensions/resolutions). When considering resolution, it may be desirable that if the first and second lines 302, 304 have a relative angle equal to the angular resolution 306, their separation at the edge of the bounding box 206 remains less than the distance resolution 308. In the examples of FIG. 3, the distance resolution 308 is depicted. The separation between the first and second lines 302, 304 only reaches the distance resolution 308 outside of the bounding box 206. In these examples, when the angular resolution is a small number, the ratio of the distance resolution 308 to the angular resolution 306 may be thought of as the distance from the origin 210 to the point at which the separation between the first and second lines 302, 304 is equal to the distance resolution. For brevity, this distance may be referred to as the resolution distance. It may be desirable that the resolution distance is greater than the size of the model as characterized by the length of the line 208. Equation (1) below is one way of expression the model size criterion according to these examples.

$$\frac{\text{Distance resolution}}{\text{Angular resolution}} > \text{model size} \tag{1}$$

In these examples, the model size criterion is met if Equation (1) is satisfied. Accordingly, meeting the model size criterion may provide that the distance and angular resolutions are appropriate for the size of the model. For example, two coincident lines that are considered parallel (e.g., because the angle the two coincident lines them is less than the angular resolution value) remain parallel and coincident over the whole model.

In some examples, if the model size criterion is not met, the processor 102 is configured to adjust one or both of the selected linear resolution values and the selected angular resolution value such that the model size criterion is met. For example, one or both of the selected distance resolution and the selected angular resolution may be adjusted in order to satisfy Equation (1) above. In some examples, the distance resolution may be adjusted first, and it may be determined whether the model size criterion is met; then, the angular resolution may be adjusted thereafter if needed. In some examples, the angular resolution may be adjusted first, and it may be determined whether the model size criterion is met; then, the distance resolution may be adjusted if needed. In some examples, both resolution values may be optimized together in order to meet the model size criterion. The choice of the order of this processing may be made in consideration of various factors. In some examples, it may be preferable to have larger resolution values instead of smaller resolution values. For example, some models may include objects that are not constructed precisely, and it may be difficult to apply geometric constraints with tighter resolutions (e.g., tighter being smaller resolution values). In such examples, the distance resolution value may first be increased (e.g., to make the left-hand side of Equation (1) larger) in an attempt to meet the model size criterion, and the angular resolution value may be decreased only if needed to meet the model size criterion.

As a result of the adjustment to meet the model size criterion, it may be the case that one or both of the resolution values no longer meet the resolution setting criterion (e.g., one or both of the resolution values no longer sit within the desired sub-intervals so as to be far from the geometric relationship values within the model). Accordingly, in some examples, if adjustment of one or both of the selected linear resolution value and the selected angular resolution value has occurred, for each adjusted resolution value, the processor 102 may be configured to perform the following processing.

In these examples, the values that have been adjusted to meet the model size criterion are referred to as the "adjusted" values. The processor 102 may select an interval from the respective sub-set of intervals that is closest to the respective adjusted resolution value. For example, for the adjusted distance resolution, the processor 102 may select a distance interval closest to the adjusted distance resolution. For example, the distance resolution may not have been adjusted to such a great degree that the distance resolution now falls outside of the original interval the distance resolution was within before the adjustment.

In these examples, the processor 102 also selects an updated value for the respective resolution within the selected interval according to the resolution setting criterion. For example, the processor 102 updates the adjusted distance resolution value such that the adjusted distance resolution value is within the sub-interval belonging to the selected interval. As discussed above, the sub-interval is defined so as to be far from the actual geometric relationship values that define the boundaries of the interval. The description in relation to the adjusted distance resolution value applies similarly to the adjusted angular resolution value. After the update to again meet the resolution setting criterion, the new resolution values may be referred to as the "updated" resolution values (e.g., for the purpose of clarity of description).

Performing the above-described processing may lead to resolution values that are far from values corresponding to geometric relationships within the model.

Once the resolution values have been selected at (iii) (e.g., according to any of the various examples described above), the processor 102 is configured to update the CAD model by implementing the set of resolution values. For example, the distance and angular resolution may be applied to the model such that objects within the model behave according to the set resolution values.

In some examples, it may be desired to iterate the processing described thus far. For example, the CAD model may include a set of initial resolution values, as previously described. For example, there may be an initial distance resolution value and an initial angular resolution value. The processor 102 may be configured to iterate (i) to iv) if one or both of the resolution values in the selected set of resolution values are different to the corresponding values from the set of initial resolution values. For example, there may be input initial resolution values prior to performing the first iteration (N=1). Those initial values may be changed according to any of the example processes described above, and the model may be updated. For the subsequent iteration (N=2), the resolution values that result from the previous iteration (N=1) are used as input into process (i). When at (i) a set of geometric relationships are determined, the set of geometric relationships are determined taking into account the resolution values that resulted from the previous iteration.

In some examples, the iterating is continued until a set number of iterations are reached or there is an iteration that does not result in a change in the selected set of resolution values. For example, for the purpose of explanation, the resolution values may not change from iteration N=5 to iteration N=6. In this case N=6 may be the final iteration. In some examples, however, the iterations may terminate after a specific number irrespective of whether or not the resolution values are still changing (e.g., the resolution values may become "good enough" for use in the model).

The resolution values resulting from the end of any example of the above processing (e.g., where there is only one iteration or more iterations) may be used as the "final" resolution values for input into subsequent processing. As discussed above, the above processing provides resolution values that are not close to values for geometric relationships. Therefore, the final resolution values do not interfere with determination of geometric relationships. In one embodiment, this lack of interference provides for geometric constraints to be set. For example, a user may input a set of geometric constraints to be implemented within the model. For example, a dimensional constraint manager (DCM) implemented by the processor 102 may perform the processing to "solve" the model according to the set of geometric constraints. As referred to herein, "solving" the model refers to successfully implementing the set of geometric constraints. Not solving the model refers to the DCM not being able to implement the set geometric constraints. For example, if the resolution values within the model interfere with a geometric relationship, a constraint corresponding to that geometric relationship may not be implemented. In such examples, the user may simply receive an error.

In some examples, the model may include objects from different sources. The different objects may be defined using different resolution values. For example, the different objects may have been constructed (e.g., using CAD software) at different times, by different users, using different software and/or using different resolutions. For example, objects that are to form parts of an assembly may be designed separately (e.g., using different resolution values) and later brought together in the CAD model in question. When a set of such objects is brought together in a single model, pre-set resolution values may not be suitable for all the objects now present within the model. Also, it may not be apparent to a user how to set resolution values given the set of different objects that exist within the model. This may cause problems in applying geometric constraints due to inappropriate resolution values. The examples described herein provide appropriate resolution values to be set. Accordingly, the examples described herein are advantages for models that include objects from different sources.

Not being able to implement geometric constraints may lead to undesirable results within the model. For example, the user may manually define relative positions and orientations within the model to achieve a similar result to that of a particular geometric constraint. However, because that particular geometric constraint is not implemented as a constraint as such, the model may not behave in the same way as if the particular geometric constrain were implement. As a simple example, changing the model to a different size scale may alter relative positions and orientations in a way inconsistent with the particular geometric constraint. In some examples, the user may implement undesirable design changes merely so that the desired geometric constraints may function. The above examples provide for geometric constraints to be successfully implemented.

As discussed above, the resolution values resulting from the end of any example of the above processing (e.g., where there is only one iteration or more iterations) may be used as the final resolution values for input into subsequent processing. In some examples, the processor 102 is configured to apply one or more geometric constraints (e.g., as specified by the user) in the model that has been updated using the final resolution values. As described above, the final resolution values are far from values corresponding to geometric relationships within the model. Therefore, various geometric constraints may successfully be applied.

As part of (v), the processor 102 is configured to generate a set of instructions for controlling a manufacturing process using the updated CAD model (as per the final iteration of (iv)). For example, the set of instructions are generated using the model in which the one or more geometric constraints have been applied. It will be appreciated that the geometric constraints help to define the geometry and/relationships between the objects within the model. Accordingly, an appropriate set of instructions for properly manufacturing the objects within the model may be generated. The manufacturing instructions may specify various parameters and processes in relation to manufacturing the objects of the model.

For example, the manufacturing instructions may specify parameters relating to cutting, drilling, sanding, grinding, machining, and the like. In some examples, the manufacturing instructions may be for an additive manufacture system such as a 3D printer. The manufacturing instructions are functional data specifically designed for controlling the operation of a manufacturing system (e.g., any machinery that may receive an input instruction and thereby perform all or part of a manufacturing process).

Accordingly, the manufacturing instructions are functional data for producing a tangible and physical result using a manufacturing process. As part of (vi), the processor is configured to output the set of instructions to a manufacturing system for the manufacturing system to control the manufacturing process according to the set of instructions. For example, the processor 102 interacts with the manufacturing system in a manner such that the processor 102 causes or facilitates the manufacturing system to produce a tangible and physical result in the form of implementing the set of instructions by performing the manufacturing process according to the set of instructions.

For example, the manufacturing process may benefit from the previously described processing of setting the resolution values. For example, a user of the CAD model may set geometric constraints that may be successfully implemented. Accordingly, the manufacturing process may be performed according to the desired design of the object in question. For example, manufactured objects may have physical features with sizes and orientations as intended. For example, where a model includes multiple objects, objects may fit together correctly as intended. Those skilled in the art will appreciate the numerous advantages to successfully implementing a set of geometric constraints to the end result from a manufacturing process.

As discussed above, the processor 102 performs a method to select resolution values. Accordingly, there may also be provided a method to select resolution values for a computer aided design model. The method includes (i) determining a set of geometric relationships in relation to a set of object representations within the computer aided design model, where each geometric relationship of the set of geometric relationships is represented by a number. The method also includes (ii) determining a set of intervals within the set of geometric relationships that meet a resolution interval criterion, where each interval of the set of intervals is a numerical range that does not include numbers representing the set of geometric relationships. The method includes (iii) selecting a set of resolution values, where each resolution value is within one of the intervals according to a resolution setting criterion. The method also includes (iv) updating the computer aided design model by implementing the set of resolution values. Further, the method also includes: (v) generating a set of instructions for controlling a manufacturing process using the updated computer aided design model; and (vi) outputting the set of instructions to a manufacturing system for the manufacturing system to control the manufacturing process according to the set of instructions. More specific examples of the method may include any feature or feature combination described above in relation the processing performed by the processor 102. There may also be provided a non-transitory computer readable data recording medium having stored thereon instructions that, when implemented by a processor, cause the processor to perform the method. For example, the non-transitory computer readable data recording medium may be in the form of one or more compact disc, a digital versatile disc, a hard disk drive, a solid state drive, a flash drive, or any other type of storage medium on which computer executable instructions may be provided.

Figure 4:
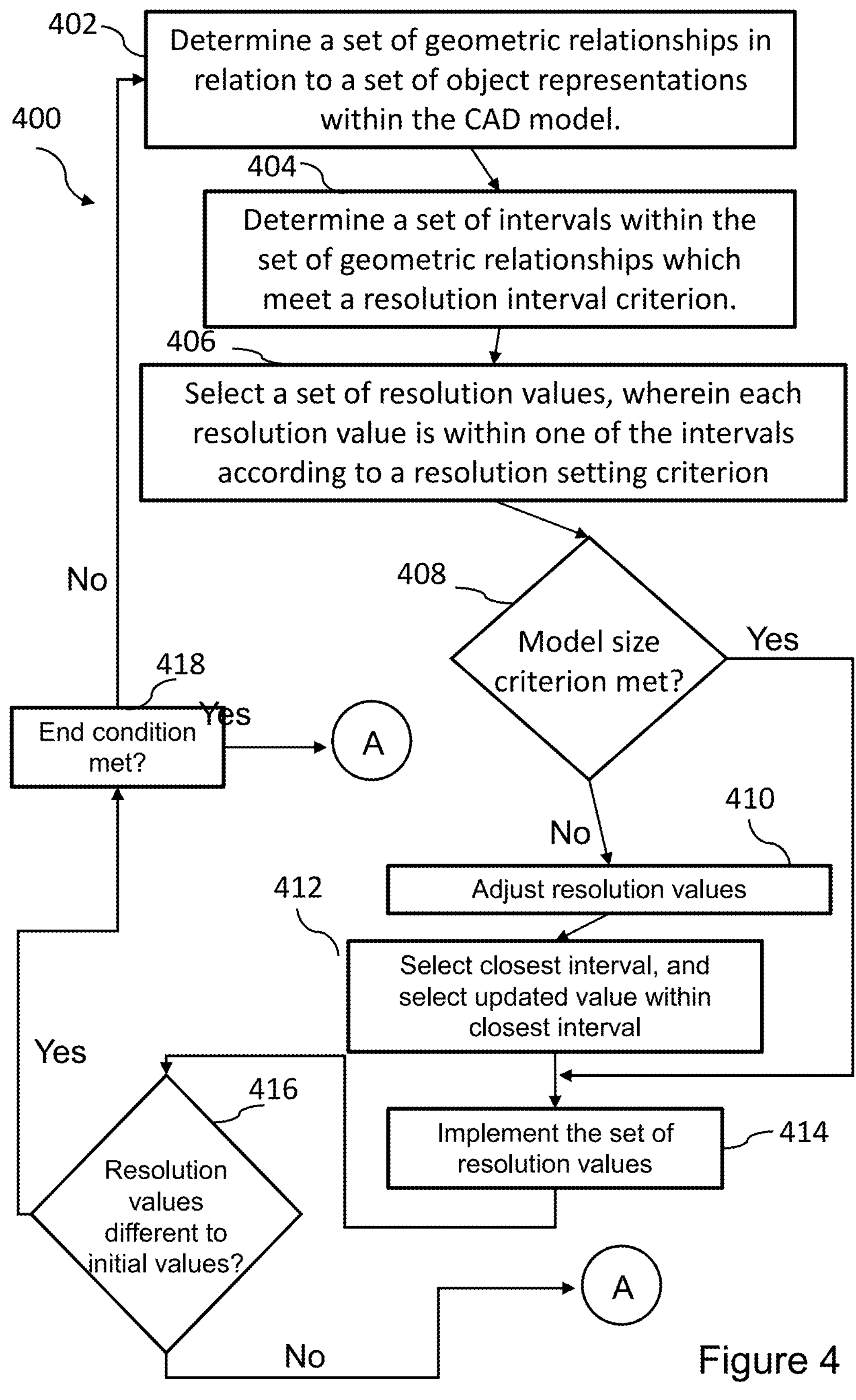
FIG. 4 is a first flow diagram illustrating a first part of a method to select resolution values, according to examples.

FIG. 4 is a flow diagram illustrating part of the method 400, according to examples. At block 402 of the method 400, a set of geometric relationships in relation to a set of object representations within the computer aided design model is determined, where each geometric relationship is represented by a number. The set of geometric relationships may be determined according to any of the examples described herein. At block 404 of the method 400, a set of intervals within the set of geometric relationships that meet a resolution interval criterion is determined, where each interval is a numerical range that does not include numbers representing the set of geometric relationships. The set of intervals may be determined according to any of the examples described herein.

At block 406 of the method 400, a set of resolution values, where each resolution value is within one of the intervals according to a resolution setting criterion is selected. The set of resolution values is selected according to any of the examples described herein. At block 408 of the method 400, it is determined whether or not the model size criterion is met, where the model size criterion is met if a ratio of the selected linear resolution value to the selected angular resolution value is greater than a model size value. Whether or not the model size criterion is met may be determined according to any of the examples described herein (e.g., as described in relation to FIGS. 2 and 3). If the model size criterion is met, then the method proceeds to block 414; otherwise, the method proceeds to block 410. At block 410 of the method 400, one or both of the selected linear resolution value and the selected angular resolution value are adjusted such that the model size criterion is met, according to any of the examples described herein. At block 412 of the method 400, for each adjusted resolution value, an interval from the respective sub-set of intervals that is closest to the respective adjusted resolution value is selected, and an updated value for the respective resolution within the selected interval according to the resolution setting criterion is selected. Block 412 may be performed according to any of the examples described herein.

Figure 5:
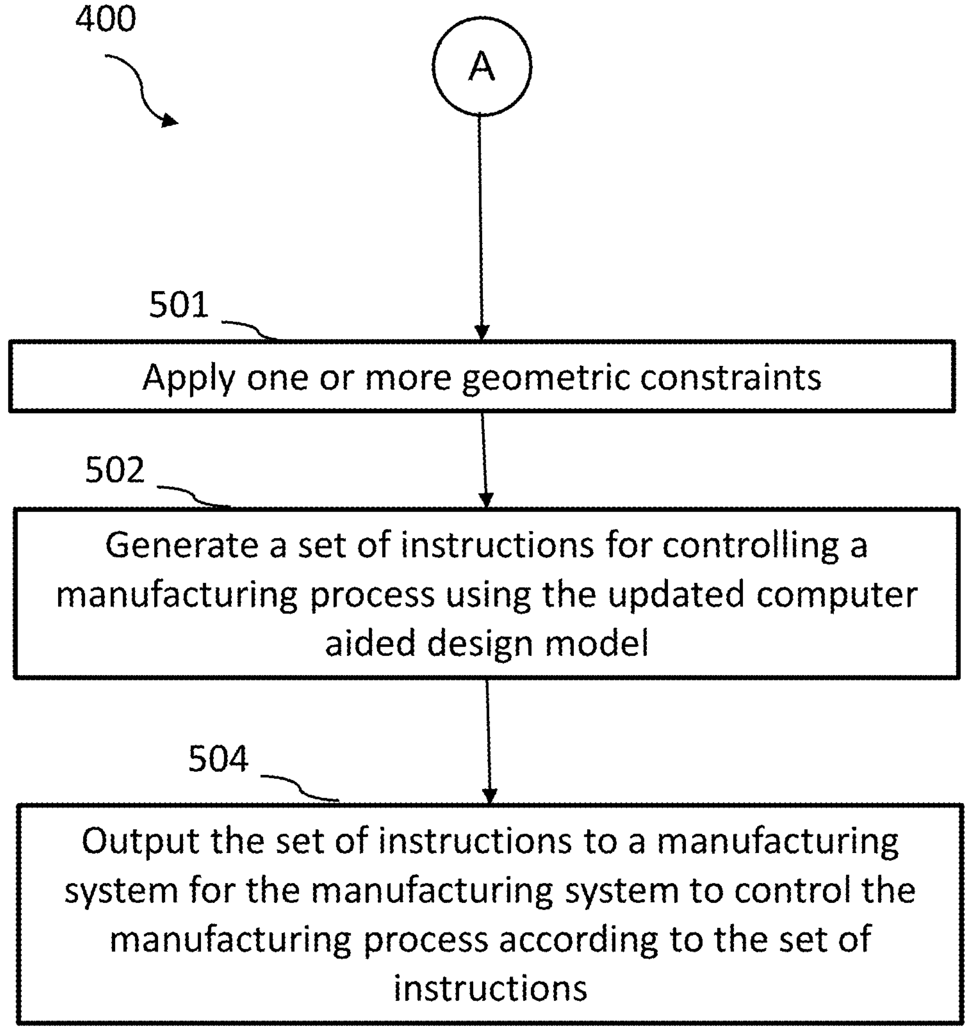
FIG. 5 is a second flow diagram of a second part of the method to select resolution values, according to examples.

At block 414 of the method 400, the CAD model is updated by implementing the set of resolution values. The CAD model may be updated according to any of the examples described herein. At block 416 of the method 400, it is determined whether one or both of the resolution values in the selected set of resolution values are different than the corresponding values from the set of initial resolution values. Block 416 may be performed according to any of the examples described herein. If yes, then the method 400 proceeds to block 418. If no, then the method 400 proceed to block 501 (see block A and FIG. 5).

At block 418, it is determined whether an end condition is met. In some examples, the end condition is met if a set number of iterations are reached or there is an iteration that does not result in a change in the selected set of resolution values. If the end condition is not met, the method 400 returns to block 402; otherwise, the method proceeds to block 501 (see block A and FIG. 5). At block 501, one or more geometric constraints are applied in the CAD model, according to any of the examples described herein.

At block 502 of the method 400, a set of instructions for controlling a manufacturing process using the updated computer aided design model is generated. At block 504 of the method 400, the set of instructions is output to a manufacturing system for the manufacturing system to control the manufacturing process according to the set of instructions.

Attention is directed to all papers and documents that are filed concurrently with or previous to this specification in connection with this application and that are open to public inspection with this specification, and the contents of all such papers and documents are incorporated herein by reference.

All of the features disclosed in this specification (including any accompanying claims, abstract, and drawings), and/or all of the acts of any method or process so disclosed, may be combined in any combination, except combinations where at least some of such features and/or acts are mutually exclusive.

Each feature disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of the foregoing example(s). The invention extends to any novel one, or any novel combination, of the features disclosed in this specification (including any accompanying claims, abstract, and drawings), or to any novel one, or any novel combination, of the acts of any method or process so disclosed.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An apparatus for performing a method to select resolution values for a computer aided design model, the apparatus comprising:

a processor configured to:

determine a set of geometric relationships in relation to a set of object representations within the computer aided design model, wherein each geometric relationship of the set of geometric relationships is represented by a number;

determine a set of intervals within the set of geometric relationships that meet a resolution interval criterion, wherein each interval of the set of intervals is a numerical range that does not include numbers representing the set of geometric relationships;

select a set of resolution values, wherein each resolution value of the set of resolution values is within one interval of the set of intervals according to a resolution setting criterion;

update the computer aided design model, the update of the computer aided design model comprising implementation of the set of resolution values;

generate a set of instructions for controlling a manufacturing process using the updated computer aided design model; and output the set of instructions to a manufacturing system for the manufacturing system to control the manufacturing process according to the set of instructions, wherein an interval of the set of intervals meets the resolution interval criterion when the interval accommodates a sub-interval, wherein a lower limit of the sub-interval is equal to a lower limit of the interval multiplied by a sub-interval factor, such that the lower limit of the sub-interval is the sub-interval factor times larger than the lower limit of the interval, wherein an upper limit of the sub-interval is equal to an upper limit of the interval divided by the sub-interval factor, such that the upper limit of the sub-interval is the sub-interval factor times smaller than the upper limit of the interval, and wherein a resolution value of the set of resolution values meets the resolution setting criterion when the resolution value is within the sub-interval corresponding to the interval within which the resolution value is set.

2. The apparatus of claim 1, wherein the sub-interval factor is between 2 and 100.

3. The apparatus of claim 2, wherein the sub-interval factor is 10.

4. The apparatus of claim 1, wherein the determination of the set of geometric relationships comprises determination of angular relationships and distance relationships, wherein the determination of the set of intervals comprises determination of a sub-set of intervals for the angular relationships, and a sub-set of intervals for the distance relationships, and wherein the selection of the set of resolution values comprises:

selection of an angular resolution value within an interval of the sub-set of intervals for the angular relationships according to the resolution setting criterion; and selection of a linear resolution value within an interval of the sub-set of intervals for the distance relationships according to the resolution setting criterion.

5. The apparatus of claim 4, wherein the selection of the set of resolution values comprises determination of whether or not a model size criterion is met, wherein the model size criterion is met when a ratio of the selected linear resolution value to the selected angular resolution value is greater than a model size value, and wherein when the model size criterion is not met, the processor is configured to adjust one or both of the selected linear resolution value and the selected angular resolution value, such that the model size criterion is met.

6. The apparatus according to claim 5, wherein the processor is further configured to:

when adjustment of one or both of the selected linear resolution value and the selected angular resolution value has occurred, for each adjusted resolution value:

select an interval from the respective sub-set of intervals that is closest to the respective adjusted resolution value; and select an updated value for the respective resolution within the selected interval according to the resolution setting criterion.

7. The apparatus of claim 4, wherein the computer aided design model comprises a set of initial resolution values, wherein the processor is further configured to iterate the determination of the geometric relationships, the determination of the set of intervals, the selection of the set of resolution values, and the update of the computer aided design model when one or both of the selected linear resolution value and the selected angular resolution value in the selected set of resolution values are different than corresponding values from the set of initial resolution values, and wherein the iteration is continued until a set number of iterations are reached or there is an iteration that does not result in a change in the selected set of resolution values.

8. The apparatus of claim 1, wherein the computer aided design model comprises a set of initial resolution values, and wherein the selection of the set of resolution values comprises:

when an initial resolution value from the set of initial resolution values is within one of the intervals according to the resolution setting criterion, selection of the initial resolution value as part of the selected set of resolution values.

9. The apparatus of claim 1, wherein the processor is further configured to:

apply one or more geometric constraints in the updated computer aided design model prior to the generation of the set of instructions.

10. A method for selecting resolution values for a computer aided design model, the method comprising:

determining a set of geometric relationships in relation to a set of object representations within the computer aided design model, wherein each geometric relationship of the set of geometric relationships is represented by a number;

determining a set of intervals within the set of geometric relationships that meet a resolution interval criterion, wherein each interval of the set of intervals is a numerical range that does not include numbers representing the set of geometric relationships;

selecting a set of resolution values, wherein each resolution value of the set of resolution values is within one of the intervals according to a resolution setting criterion;

updating the computer aided design model, the updating of the computer aided design model comprising implementing the set of resolution values;

generating a set of instructions for controlling a manufacturing process using the updated computer aided design model; and outputting the set of instructions to a manufacturing system for the manufacturing system to control the manufacturing process according to the set of instructions, wherein an interval meets the resolution interval criterion when the interval accommodates a sub-interval, wherein a lower limit of the sub-interval is equal to a lower limit of the interval multiplied by a sub-interval factor, such that the lower limit of the sub-interval is the sub-interval factor times larger than the lower limit of the interval, wherein an upper limit of the sub-interval is equal to an upper limit of the interval divided by the sub-interval factor, such that the upper limit of the sub-interval is the sub-interval factor times smaller than the upper limit of the interval, and wherein the resolution setting criterion is meetable when the resolution value is within the sub-interval corresponding to the interval within which the resolution value is set.

11. The method of claim 10, wherein the sub-interval factor is between 2 and 100.

12. The method of claim 10, wherein determining the set of geometric relationships comprises determining angular relationships and distance relationships;

wherein determining the set of intervals comprises determining a sub-set of intervals for the angular relationships, and a sub-set of intervals for the distance relationships, and wherein selecting the set of resolution values comprises:

selecting an angular resolution value within an interval of the sub-set of intervals for the angular relationships according to the resolution setting criterion; and selecting a linear resolution value within an interval of the sub-set of intervals for the distance relationships according to the resolution setting criterion.

13. The method of claim 12, wherein selecting the set of resolution values comprises:

determining whether or not a model size criterion is met, wherein the model size criterion is met when a ratio of the selected linear resolution value to the selected angular resolution value is greater than a model size value; and when the model size criterion is not met, adjusting one or both of the selected linear resolution value and the selected angular resolution value such that the model size criterion is met, wherein when the adjusting of one or both of the selected linear resolution value and the selected angular resolution value has occurred, for each adjusted resolution value, the method further comprises:

selecting an interval from the respective sub-set of intervals that is closest to the respective adjusted resolution value; and selecting an updated value for the respective resolution value within the selected interval according to the resolution setting criterion.

14. The method of claim 12, wherein the computer aided design model comprises a set of initial resolution values, wherein the method further comprises iterating the determining of the set of geometric relationships, the determining of the set of intervals, the selecting of the set of resolution values, and the updating of the computer aided design model when one or both of the selected linear resolution value and the selected angular resolution value in the selected set of resolution values are different to corresponding values from the set of initial resolution values, and wherein the iterating is continued until a set number of iterations are reached or there is an iteration that does not result in a change in the selected set of resolution values.

15. The method of claim 10, wherein the computer aided design model comprises a set of initial resolution values, and wherein selecting the set of resolution values comprises when an initial resolution value from the set of initial resolution values is within one of the intervals according to the resolution setting criterion, selecting the initial resolution value as part of the set of resolution values.

16. The method of claim 10, further comprising:

applying one or more geometric constraints in the updated computer aided design model prior to generating the set of instructions.

17. In a non-transitory computer-readable storage medium that stores instructions executable by one or more processors to select resolution values for a computer aided design model, the instructions comprising:

determining a set of geometric relationships in relation to a set of object representations within the computer aided design model, wherein each geometric relationship of the set of geometric relationships is represented by a number;

determining a set of intervals within the set of geometric relationships that meet a resolution interval criterion, wherein each interval of the set of intervals is a numerical range that does not include numbers representing the set of geometric relationships;

selecting a set of resolution values, wherein each resolution value of the set of resolution values is within one of the intervals according to a resolution setting criterion;

updating the computer aided design model, the updating of the computer aided design model comprising implementing the set of resolution values;

generating a set of instructions for controlling a manufacturing process using the updated computer aided design model; and outputting the set of instructions to a manufacturing system for the manufacturing system to control the manufacturing process according to the set of instructions, wherein an interval of the set of intervals meets the resolution interval criterion when the interval accommodates a sub-interval, wherein a lower limit of the sub-interval is equal to a lower limit of the interval multiplied by a sub-interval factor, such that the lower limit of the sub-interval is the sub-interval factor times larger than the lower limit of the interval, wherein an upper limit of the sub-interval is equal to an upper limit of the interval divided by the sub-interval factor, such that the upper limit of the sub-interval is the sub-interval factor times smaller than the upper limit of the interval, and wherein a resolution value of the set of resolution values meets the resolution setting criterion when the resolution value is within the sub-interval corresponding to the interval within which the resolution value is set.

18. An apparatus for performing a method to select resolution values for a computer aided design model, the apparatus comprising:

a processor configured to:

determine a set of geometric relationships in relation to a set of object representations within the computer aided design model, wherein each geometric relationship of the set of geometric relationships is represented by a number;

determine a set of intervals within the set of geometric relationships that meet a resolution interval criterion, wherein each interval of the set of intervals is a numerical range that does not include numbers representing the set of geometric relationships;

select a set of resolution values, wherein each resolution value of the set of resolution values is within one interval of the set of intervals according to a resolution setting criterion;

update the computer aided design model, the update of the computer aided design model comprising implementation of the set of resolution values;

generate a set of instructions for controlling a manufacturing process using the updated computer aided design model; and output the set of instructions to a manufacturing system for the manufacturing system to control the manufacturing process according to the set of instructions, wherein the determination of the set of geometric relationships comprises determination of angular relationships and distance relationships, wherein the determination of the set of intervals comprises determination of a sub-set of intervals for the angular relationships, and a sub-set of intervals for the distance relationships, and wherein the selection of the set of resolution values comprises:

selection of an angular resolution value within an interval of the sub-set of intervals for the angular relationships according to the resolution setting criterion; and selection of a linear resolution value within an interval of the sub-set of intervals for the distance relationships according to the resolution setting criterion.

* * * * *